C. C. McDONALD.
MAGNETIZER.
APPLICATION FILED NOV. 18, 1914.
1,176,474.
Patented Mar. 21, 1916.
2 SHEETS—SHEET 2.
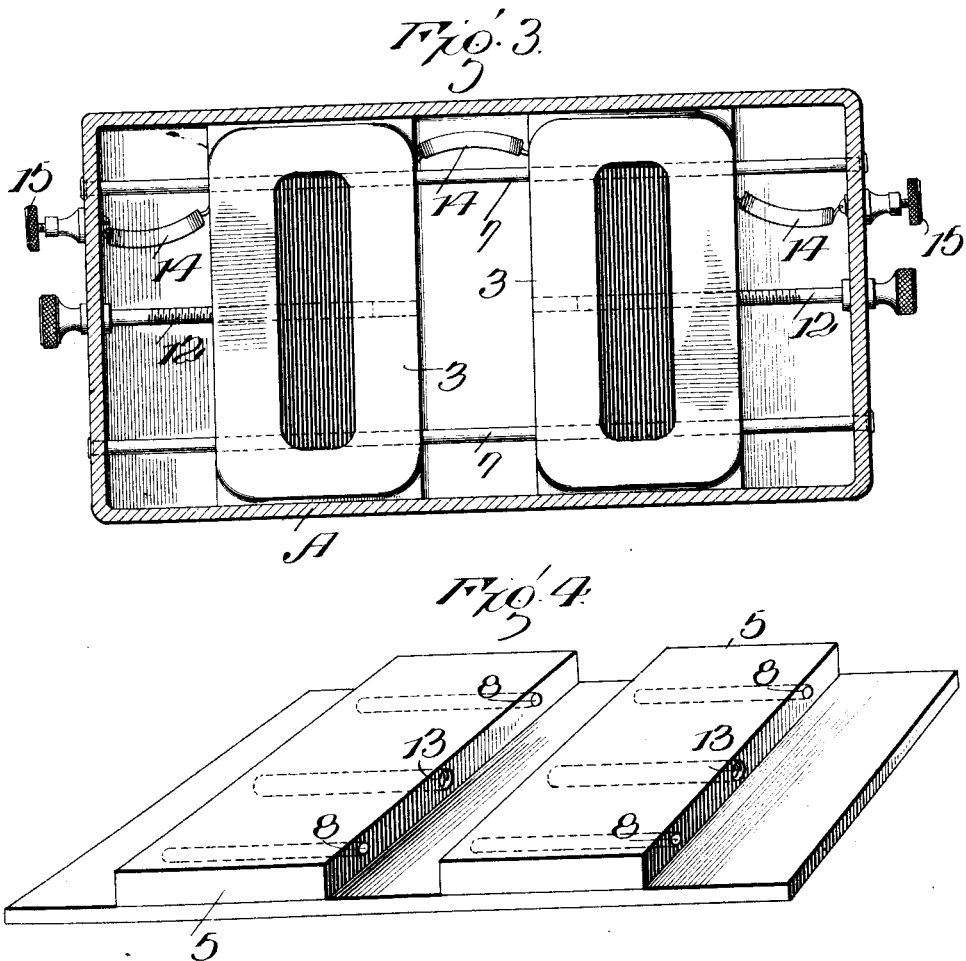
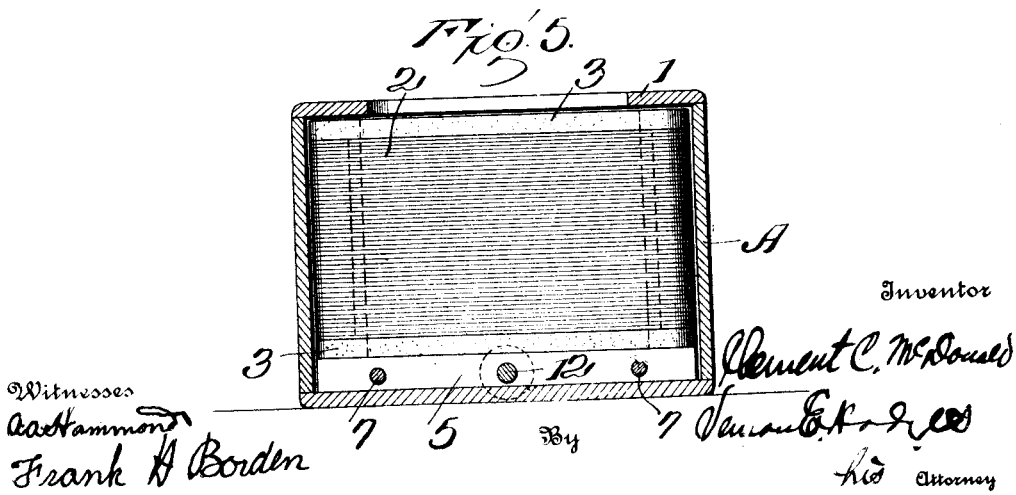

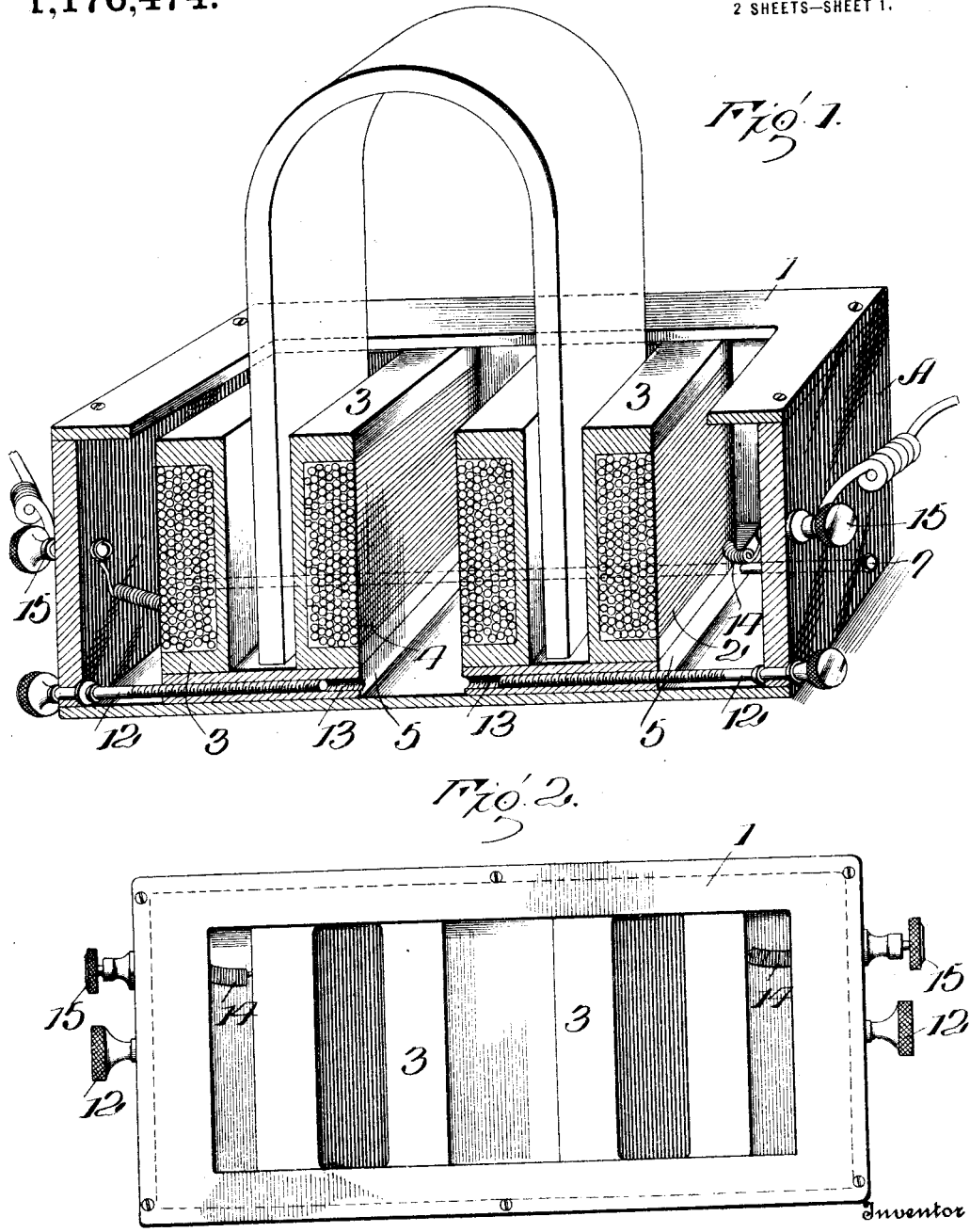

UNITED STATES PATENT OFFICE.

CLEMENT C. McDONALD, OF CHENOA, ILLINOIS.

MAGNETIZER.

1,176,474.     Specification of Letters Patent.     Patented Mar. 21, 1916.

Application filed November 18, 1914. Serial No. 872,775.

*To all whom it may concern:*

Be it known that I, CLEMENT C. McDONALD, a citizen of the United States, residing at Chenoa, in the county of McLean and State of Illinois, have invented certain new and useful Improvements in Magnetizers, of which the following is a specification.

My invention relates to an improvement in magnetizers.

As is well known, permanent magnets lose a certain amount of their magnetism, and the object of my present invention is to provide a simple mechanism for re-magnetizing magnets, such as are used in magnetos and spark-generators for automobiles and other purposes.

The invention mainly consists in a box containing two coils, which are adjustable therein, and adapted to receive in their open centers the poles of various-sized magnets, the adjustment being provided to accommodate their positions to the size of horseshoe magnet.

In the accompanying drawings:—Figure 1 is a view in longitudinal section in perspective; Fig. 2 is a plan view; Fig. 3 is an enlarged plan with the top removed; Fig. 4 is a view in perspective of the bottom showing the adjustable magnet-seats; and Fig. 5 is a vertical transverse section.

A, is a case of suitable size and made of suitable material. This is open at the top, save for the open-centered rim 1 which is removably secured thereon, leaving the openings in the electro-magnets exposed and accessible therethrough.

The cores or spools 2, 2 of the magnets are preferably in the form of the letter O, with flanges 3, 3, at top and bottom, the windings 4 surrounding the core and housed between the flanges. These magnets are preferably mounted on seats 5, 5, resting on the bottom 6 of the casing, as shown in Fig. 3. A rod or rods 7, 7, extend through holes 8, 8, in these seats from opposite ends of the casing to form guides therefor.

Screws 12, 12, are swiveled in the ends of the casing and turn in threaded holes 13, 13, adapted to receive them in the magnet-seats 5, 5, whereby to adjust the magnets within the case to the size of the horseshoe magnet to be re-magnetized.

Conductors 14, 14, extend from one coil to the other, and from the coils to the inner ends of the binding-posts 15, preferably mounted in the opposite ends of the case.

By the use of this magnetizer, the process of either magnetizing or re-magnetizing horseshoe magnets is made very simple and easy. Its poles are simply inserted in the central openings of the two coils after the latter shall have been adjusted to the size of the magnet under treatment, thus making the process both simple and inexpensive.

Changes of a more or less simple nature might be made in the construction described, that illustrated being merely an illustrative form of the invention, without departure from the spirit and scope of my invention; and hence I do not wish to be limited specifically thereto:—

I claim:—

1. The combination of a casing, magnet seats therein, a guide extending through the latter into the casing, actuating means comprising screws coöperating between the casing and the seats for moving one with respect to the other, and magnets mounted on said magnet seats.

2. A magnetizer comprising a casing having a base, seats slidably mounted on the base, electromagnets mounted on the seats, a rim mounted on the box extending inwardly a distance substantially equal to the distance from the outside of the coil to the openings in the spools, and means for adjusting the coils with respect to each other.

3. In a magnetizer the combination with a casing having openings, a base, seats slidably mounted on said base having openings and having screw threaded openings running transversely therethrough, rods fastened in the openings in the box and adapted to be slidably received in the seats, screws rotatably mounted in the box, and engaging the screw threaded openings in said seats, and magnetizing means mounted on said seats adapted to receive the ends of a magnet, said magnetizing means being controlled in its movement by said screws.

In testimony whereof I affix my signature, in the presence of two witnesses.

CLEMENT C. McDONALD.

Witnesses:
L. L. SILLIMAN,
F. R. ABBOTT.